Patented Apr. 9, 1935

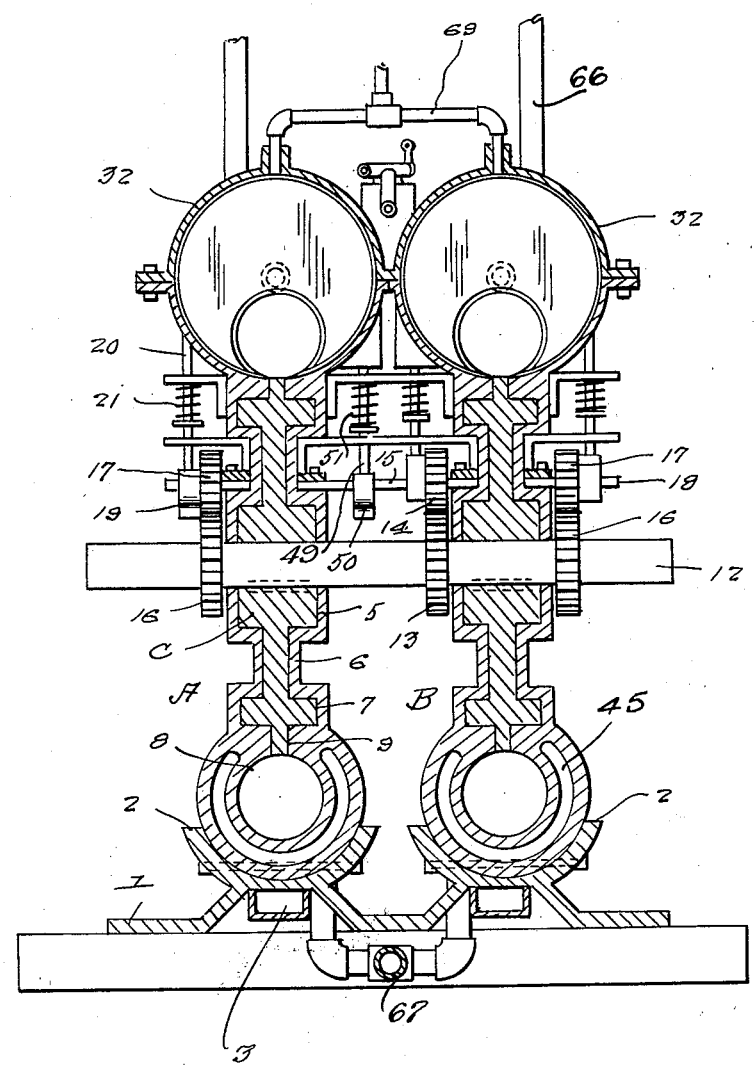

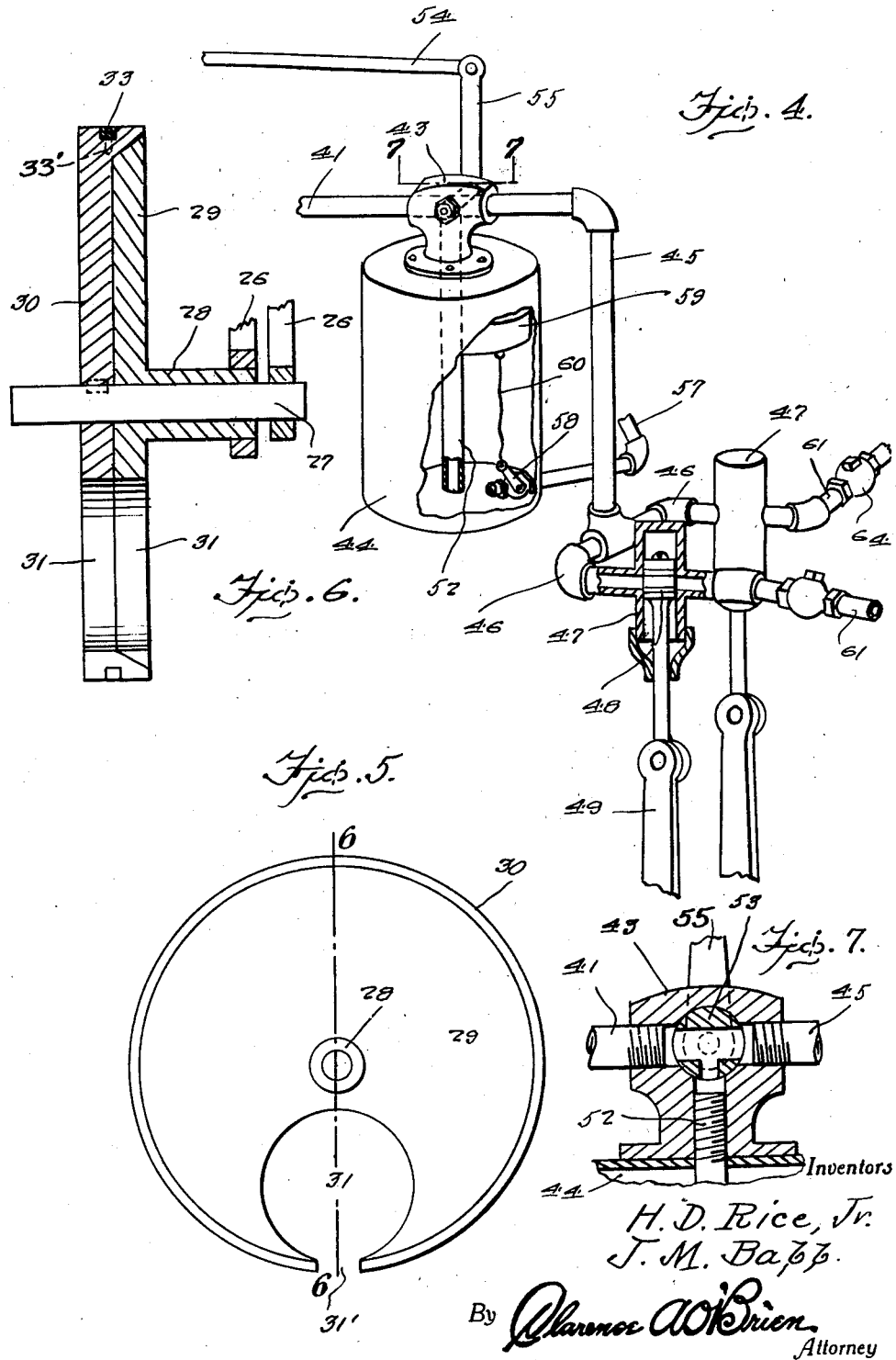

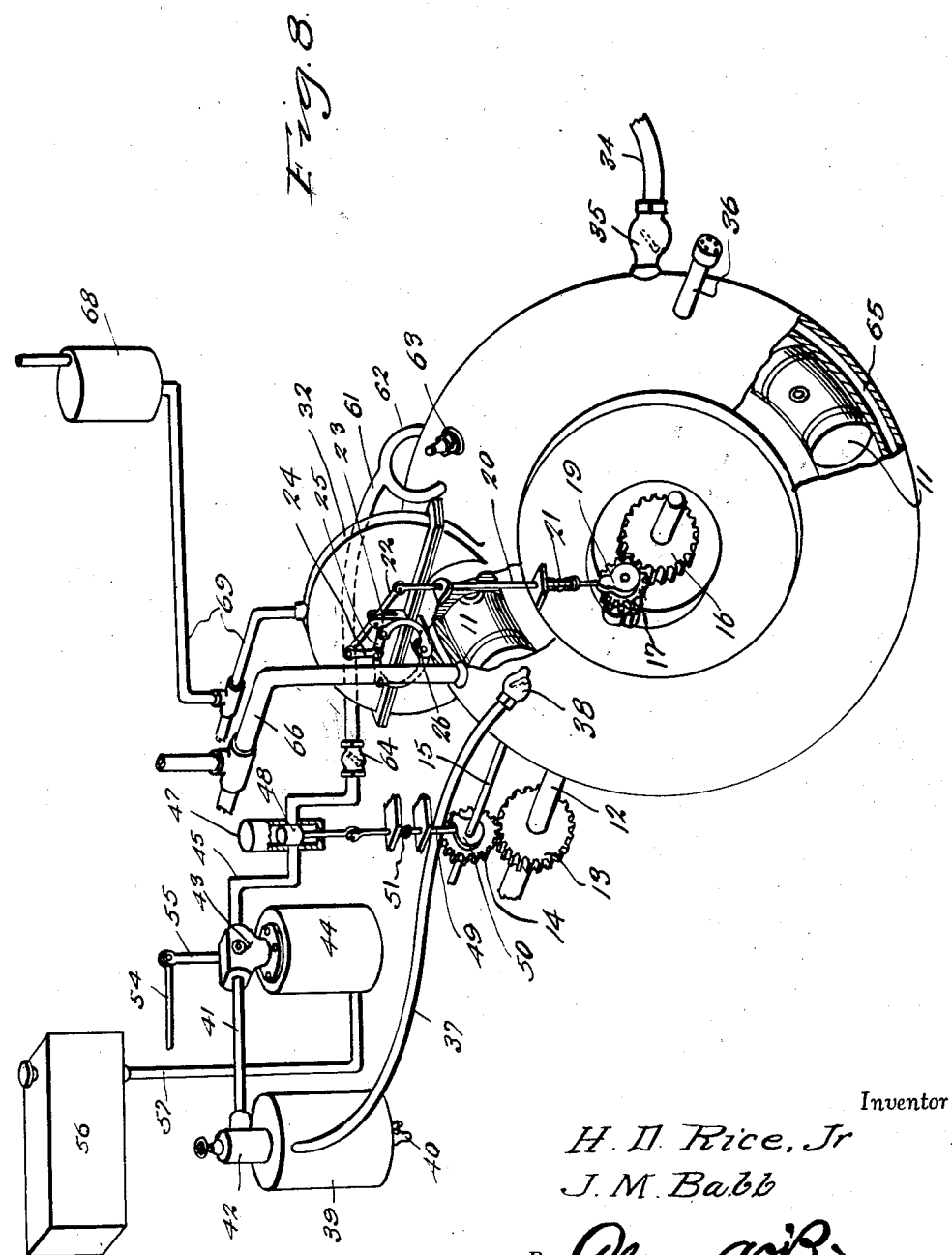

1,997,119

UNITED STATES PATENT OFFICE 1,997,119

INTERNAL COMBUSTION ROTARY MOTOR

Hudson Donphian Rice, Jr. and James Madison Babb, Dallas, Tex.

Application May 9, 1932, Serial No. 610,228

2 Claims. (Cl. 123—15)

This invention relates to an internal combustion rotary motor, the general object of the invention being to provide a pair of cylinders each provided with a rotor carrying piston, to rotate in the cylinder, with means for compressing air by the pistons and forcing it into a tank from which the air is taken and mixed with fuel and ejected into the cylinder in front of an abutment and in rear of a piston, so that when the mixture is ignited, the gases will drive the piston forwardly by action on the piston and the closed abutment.

Another object of the invention is to provide a rotary abutment for each cylinder composed of two disks, each having a perforation thereon with means for operating the abutment from a movable part of the motor to place the perforations in alinement just before the piston reaches the abutment so that the piston can pass through after which the disks are moved in opposite directions to close the opening to form a wall across the cylinder against which the expanding gases act to drive the piston forwardly.

This invention also consists in certain other features of construction and in the combination and arrangement of the several parts to be hereinafter fully described, illustrated in the accompanying drawings and specifically pointed out in the appended claims.

In describing the invention in detail reference will be had to the accompanying drawings wherein like characters denote like or corresponding parts throughout the several views, and in which:—

Fig. 3 is a vertical sectional view on line 3—3 of Figure 1.

Fig. 4 is a perspective view partly in section showing the fuel tank, the control valves, and the pipe line for leading the compressed air through the carburetor on the fuel tank and into the control valve casings and the pipes leading from the said casings.

Fig. 5 is a view of one of the disks.

Fig. 6 is a sectional view on line 6—6 of Figure 5.

Fig. 7 is a sectional view through the valve on the top of the fuel tank the section being taken on line 7—7 of Figure 4.

Figure 8 is a diagrammatic view of the invention, with parts broken away, but showing but one cylinder.

Figure 1:
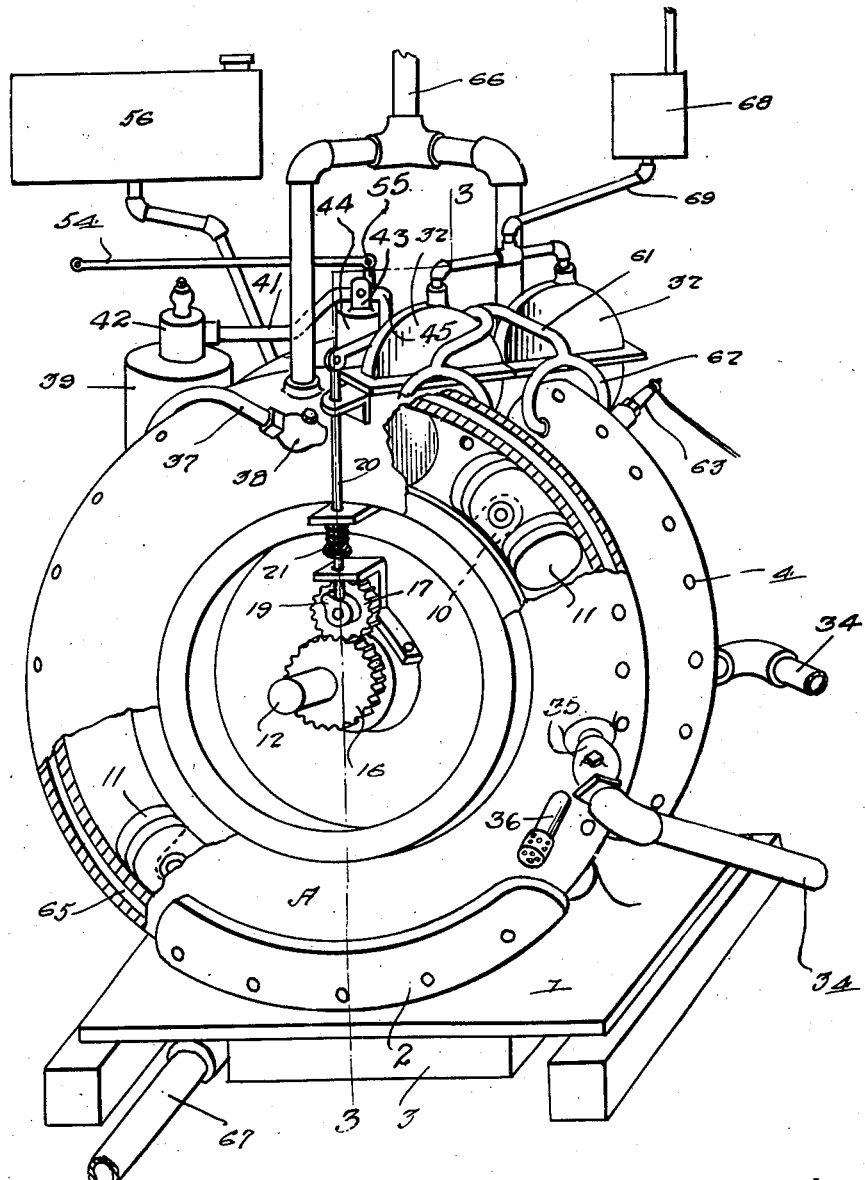
Figure 1 is a perspective view with parts broken away.

In these drawings, the numeral 1 indicates a base which is formed with the pair of substantially arc-shaped troughs 2 for supporting the vertically arranged cylinder forming members A and B and said base is provided with the oil tanks 3 to receive excessive oil from the oiling system.

Each of the members A and B is composed of two sections, bolted together, as shown at 4 and these sections are shaped to form an enlarged circular central part 5, a smaller annular space 6, an outer annular space 7 which is of rectangular shape in cross section, an annular cylinder forming space 8 and an annular flat-like portion 9 which connects the inner circumference of the cylinder 8 with the space 7. Each of the rotors C is formed with an enlarged hub which fits in the space 5, an annular narrow portion which fits in the space 6, a second annular portion of rectangular shape in cross section which fits in the space 7 and a narrow rim which fits in the portion 9 and has the projections 10 to which the pistons 11 are connected, these pistons of course being located in the cylinder 8.

The hubs of the two rotors are keyed to the shaft 12 which passes through the central portions of the two members A and B and this shaft carries a gear 13 which meshes with a gear 14 on the cam shaft 15 and it also carries the gears 16 which mesh with the gears 17 on the shafts 18 which carry the cams 19. The cams 19 operate the push rods 20, each of which is held against its cam by the spring 21. Each push rod has its upper end pivoted to a rocker arm 22 pivoted to a post 23 and the inner end of each rocker arm has a link 24 pivoted thereto to the lower end of which the inner ends of the links 25 are pivoted, the outer ends of these links being pivoted to the arms 26 which are curved and one of which is connected to a shaft 27 passing through a hub 28 of a disk 29, the shaft being keyed to a second disk 30 as clearly shown in Fig. 6.

These two disks form an oscillatory abutment and the other arm 26 is connected to the hub 28. Thus as the rocker arm 22 is rocked by the upward movement of the push rod its inner end moves downwardly so that the link 24 causes the links 25 to move the arms 26 apart which results in moving of the disks 29 and 30 in opposite directions so as to place the openings 31 in the two disks in registry with each other and thus open communication between two parts of the cylinder 8 for the passage of the piston.

As will be seen, each abutment composed of the disks 29 and 30 is located in a circular casing 32 forming part of each of the members A and B. As the push rod moves downwardly under the action of the spring, the rocker arm 22 is rocked in the opposite direction so that the links move the arms 26 towards each other and thus the rotary movement of the disks 29 and 30 will close the openings 31 and thus form a partition across the cylinder which provides a combustion space with the rear end of the piston which has just passed through the opening formed by the openings 31 of the two disks registering with each other.

As shown in Fig. 6, the disk 29 fits in a recess formed in the disk 30 with the periphery of the disk 29 beveled to engage a beveled wall of the recess, and said disk 30 has a groove therein to receive a ring 33 which has its ends spaced apart to provide a space which registers with the notches 31' formed in the two disks 29 and 30 and which communicate with the openings 31.

These notches permit passage of the connecting projection or rod 10 to which the piston is connected. A pin, 33', projects into the groove and engages the ring 33 which prevents rotary movement of the ring in the groove.

Each cylinder is provided with an exhaust pipe 34 having an outwardly opening check valve 35 therein and beyond the exhaust is provided an air intake 36. Thus as the piston passes the exhaust the exhaust gases will pass through said exhaust pipe 34 and then as the piston passes the air inlet, air will be drawn into the cylinder and the exhaust gases are prevented from flowing back into the exhaust pipe by means of the check valve 35. Air is drawn into the cylinder through the air inlet 36, after one piston has passed the inlet, due to the fact that the other piston has not yet reached the abutment so that said abutment is still closed, so that from the time the first piston passes the air inlet until the second piston reaches the abutment, the chamber formed by that part of the cylinder between the closed abutment and the rear end of the first piston, is expanding and thus air will be drawn into said chamber. The air in front of the piston will be compressed between the piston and the closed rotary abutment and this air will pass through the pipe 37 in communication with each cylinder immediately in rear of each abutment, and contains the check valve 38. These pipes 37 lead the compressed air into a tank 39 having a drain valve 40 in its bottom and the air can pass from the top of the tank thru a pipe 41 containing a manually operated valve 42, said pipe 41 being connected to the valve casing or carbureter 43 placed on top of the fuel tank 44.

A pipe 45 connects the casing 43 with the branch pipes 46 which are connected with the valve casings means 47 in which reciprocates the piston valves 48 the stems of which are connected to the rods 49 which are operated by the cams 50 on the shaft 15 and said rods are held against the shaft by the springs 51. A pipe 52 has its upper end connected with the casing 43 and its lower end extends to a point adjacent the bottom of the fuel tank 44.

A three-way valve plug 53 is arranged in the casing 43 and is operated from a distant point by means of the rod 54 and the arm 55 which is connected with the valve 53.

Figure 2:
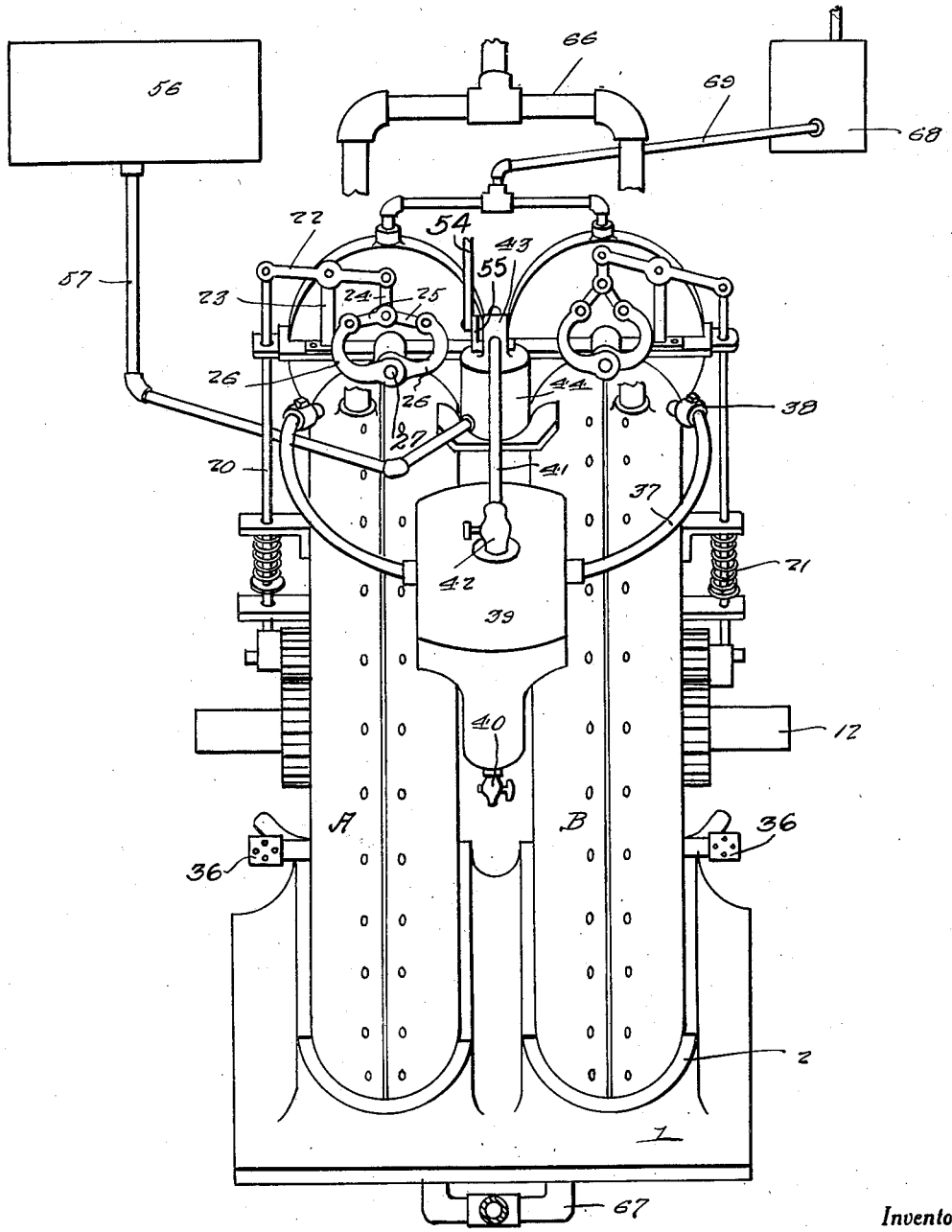
Fig. 2 is a side view.

A fuel tank 56, elevated as shown in Fig. 2, is connected by a pipe 57 with the lower part of the tank 44. A valve 58 is located in the tank 44 and controls the flow of fuel from the tank 56 into the tank 44 and this valve is operated by means of a float 59 in the tank 44 through means of a cable 60. Thus when the tank 44 is about two-thirds full, the float 59 will close the valve 58 and the air above the liquid level is compressed so that this air acts to force the liquid thru the pipe 52 into the casing 43 where it will mix with the compressed air passing from the tank 39 through the pipe 41 into the pipe 45 and the flow of this compressed air past the upper end of the pipe 52 acts to draw the fuel from the tank. This mixture of air and fuel will discharge into the valve casings 47 when the valves 48 are open and from these casings the mixture will pass through the pipes 61 into the branch pipes 62 which enter the cylinders at opposite sides of each cylinder immediately in front of the disk abutment and in rear of the piston which has just passed through the abutment. Then the mixture is fired by the spark plug 63 in each cylinder which forms part of an ignition system and thus the resultant gases acting against the rear end of the piston and the partition formed by the closed disks abutment will force the piston and the rotor forwardly.

Each of the pipes 61 has a combined spray and check valve 64 therein. Each cylinder is provided with a water space 65 which is supplied with water through any desired means which includes a supply pipe 66 and the discharge pipe 67 and the parts are supplied with lubricant through means of the tank 68 and the pipe 69 which delivers the oil to the casings 32 from which the oil passes downwardly between the rotors and the cylinders and finally finds its way to the pan 3.

The cam 19 must, of course, be constructed to hold the abutment disks 29 and 30 in open position long enough for a piston 11 to pass through the registering openings 31 in the disks and as soon as the piston passes through, the high part of the cam will pass from under the rod 20 so that the spring will lower the rod and thus cause the operating means of the disks 29 and 30 to move the same to closed position, thus forming a wall across the cylinder in rear of the piston which has just passed through the abutment. Just after the abutment means are moved to closed position, the cam 50 on the shaft 15, driven from the shaft 12 by means of the gears 13 and 14, moves the valve 48 to open position and thus the explosive mixture can pass from the carbureter 43 through the pipes 45 and 61 and the branches 62 and enter the combustion space formed by the closed abutment and the rear end of the piston which has just passed through the abutment. The valve 48 is then moved to closed position and the circuit to the plug 63 is closed to ignite the mixture.

The piston is thus driven forwardly and after it passes the exhaust 34, the exhaust gases pass from the cylinder through the exhaust 34, the valve 35 preventing back flow of the exhaust gases into the cylinder. The piston then passes the air inlet 63 and draws in air into the cylinder and the air previously drawn into the cylinder by the other piston passing the air inlet 63 is compressed between the piston and the closed abutment and this air flows through the pipe 37, past the check valve 38, into the tank 39. The compressed air from the tank flows through the pipe 41 and the amount of air passing from the tank con be controlled by adjusting the valve 42. The air passes from the pipe 41 into the carburetor or casing 43 where it is mixed with the fuel from the pipe 52 in the tank 44 and then the mixture passes through the pipe 45 and when the valve 48 is opened, the mixture will pass through the pipe 61 past the valve 64 and through the branches 62 into the combustion chamber formed by the closed abutment and the rear end of the piston which has just passed through the abutment.

The speed of the motor is controlled by the valve 53 in the casing 43 which can be adjusted from a distant point by the rod 54 connected to the arm 55 of the valve.

As soon as the piston passes the exhaust pipe, the exhaust gases will pass out through said pipe, past the valve 35 and then when the piston passes the air inlet 36, air will be drawn into the cylinder in rear of said piston through said inlet 36, due to the fact that the other piston has not reached the abutment and therefore the abutment is closed and the space in the cylinder between the closed abutment and the rear end of the first piston is expanding and thus air will enter through the inlet 36 until the second piston starts to pass through the abutment. As before stated, the air previously drawn into the cylinder by the second piston will be compressed by the first piston between itself and the abutment and this air will pass into the pipe 37 through the check valve 38.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described our invention, what we claim as new is:—

1. In a rotary motor including a ring-shaped cylinder, a rotor and a piston connected with the rotor and travelling in said cylinder, an abutment member extending into the cylinder and composed of two disks, each having an opening therein, which, when in registry with each other will permit the passage of the piston through the abutment member, means for moving one disk relatively to the other to place the openings into and out of registry with each other, each disk also having a notch in its periphery in communication with the opening in the disk for the passage of that part of the rotor which is connected with the piston, and one disk having a recess in one face thereof formed with beveled side walls, the other disk fitting in said recess and having its periphery beveled to engage the beveled side walls, said disk provided with the recess having a groove in its periphery and a ring fitting in said groove with its ends spaced apart at the notch in said disk.

2. A rotary motor of the class described comprising an annular cylinder having an air inlet port and an exhaust port in advance of the air inlet port, a rotor, pistons carried thereby and traveling in the cylinder, a shaft to which the rotor is connected, an abutment member passing transversely through the cylinder, means operated from the shaft for opening the abutment member to permit a piston to pass, after which the abutment member is closed to form a combustion space between itself and the piston, the air drawn into the cylinder through the air inlet by a piston passing the inlet being compressed by the following piston between itself and the closed abutment member, a tank, a pipe for leading the compressed air from the cylinder into the tank, a conduit leading the compressed air from the tank into the combustion space formed by the closed abutment and a piston, means for introducing fuel into the conduit and mixing it with the air, a valve for controlling the passage of the mixture through the conduit, means operated from the shaft for opening said valve after the abutment member has been closed to permit the mixture to enter the combustion space between said abutment member and the piston, and means for igniting the combustion mixture in the combustion space.

HUDSON DONPHIAN RICE, Jr.
JAMES MADISON BABB.